(12) United States Patent
Min

(10) Patent No.: US 7,714,519 B2
(45) Date of Patent: May 11, 2010

(54) ILLUMINANCE STABILIZATION APPARATUS FOR VEHICLE HEADLAMP

(75) Inventor: Jae Woong Min, Songpa-gu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 158 days.

(21) Appl. No.: 12/082,213

(22) Filed: Apr. 10, 2008

(65) Prior Publication Data

US 2009/0102384 A1  Apr. 23, 2009

(30) Foreign Application Priority Data

Oct. 19, 2007  (KR) ................... 10-2007-0105525

(51) Int. Cl.
*H05B 37/02* (2006.01)
*B60Q 1/02* (2006.01)

(52) U.S. Cl. .................. 315/291; 315/82; 315/244

(58) Field of Classification Search ............... 315/82, 315/209 R, 224, 225, 242, 244, 247, 289, 315/291, 307, 308
See application file for complete search history.

(56) References Cited

U.S. PATENT DOCUMENTS 5,015,918 A * 5/1991 Copeland ................... 315/76
6,838,838 B2 * 1/2005 Okamoto et al. ............ 315/308
7,339,327 B2 * 3/2008 O'Gorman et al. .......... 315/244

* cited by examiner

*Primary Examiner*—Douglas W Owens
*Assistant Examiner*—Jimmy T Vu
(74) *Attorney, Agent, or Firm*—Edwards Angell Palmer & Dodge LLP; Peter F. Corless

(57) ABSTRACT

An illumination stabilization apparatus for a vehicle headlamp is disclosed. The illumination stabilization apparatus supplies stable power to a headlamp using a SEPIC, thus increasing the lifespan of a headlamp, and reducing the dimming of light generated by the headlamp.

2 Claims, 4 Drawing Sheets

ILLUMINANCE STABILIZATION APPARATUS FOR VEHICLE HEADLAMP

CROSS-REFERENCE TO RELATED APPLICATIONS

This application claims priority to Korean Application No. 10-2007-0105525, filed on Oct. 19, 2007, the entire disclosure of which is incorporated herein by reference.

BACKGROUND

1. Technical Field

The present invention relates to an illumination stabilization apparatus for a vehicle headlamp, which uses a Single Ended Primary Inductance Converter (SEPIC) to stably supply power to a headlamp.

2. Background Art

A vehicle headlamp is a lamp for illuminating the area ahead of a vehicle to ensure safe traveling during periods of low visibility, such as at night. Such a vehicle headlamp must emit light having uniform illuminance in order for the driver to recognize obstacles located ahead of the vehicle and secure a certain range of vision, and for the drivers of oncoming vehicles to travel comfortably. Therefore, stably supplying constant power from a battery to a headlamp has been recognized to be important.

Conventionally, a push-pull converter, a buck-boost converter, etc. are used to stably supply power.

The push-pull converter, as shown in FIG. 1A, includes a transformer T having a center tap on the primary side thereof, two power switches TR1 and TR2 connected to the primary side, full-wave rectifier diodes D1 and D2 connected to the secondary side of the transformer, and an LC filter connected to an output terminal.

The operation of the push-pull converter is briefly described. The push-pull converter is operated such that the two power switches TR1 and TR2 are periodically turned on or off, and thus voltages having a phase difference of 180 degrees are applied.

However, the push-pull converter, which is generally used to control power of 500 Watts or more, is problematic in that it is not suitable for vehicles because it has a large size and generates a large amount of heat.

The buck-boost converter, as show in FIG. 1B, is a DC-DC converter for outputting a voltage higher or lower than a certain input voltage value, and includes a switch TR1, an inductor L1, a rectifier diode D1, and a capacitor C1.

The operation of the buck-boost converter is briefly described. When the switch is in on, an input stage and an output stage are separately operated by the rectifier diode, whereas, when the switch is in off, the influence of input power is eliminated, the inductor L1 is connected to an output load, and the energy stored in the inductor is transferred to the capacitor C1 and the load.

However, the buck-boost converter has problems in that an excessive voltage ripple is generated in the switch at the time of control in a Discontinuous Conduction Mode (DCM), and in that additional passive elements (for example, an inductor) are required at the time of control in a Continuous Conduction Mode (CCM), and thus heat is generated.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made keeping in mind the above problems occurring in the prior art, and an object of the present invention is to provide an illumination stabilization apparatus, which is implemented using a Single Ended Primary Inductance Converter (SEPIC), so that stable power can be supplied, thus improving vehicle convenience.

Another object of the present invention is to provide an illumination stabilization apparatus which increases the lifespan of vehicle lamps and reduces the maintenance costs thereof.

A further object of the present invention is to provide an illumination stabilization apparatus for a vehicle headlamp, which requires no additional device, thus decreasing the manufacturing costs of a vehicle.

In order to accomplish the above objects, a preferred embodiment of the present invention provides an illumination stabilization apparatus for a vehicle headlamp, comprising: a voltage step-up/step-down circuit unit for stepping up or down an input voltage to a voltage according to a switch signal, and outputting the stepped-up or stepped-down voltage; an error amplification circuit for comparing the output voltage of the voltage step-up/step-down circuit unit with an external reference voltage, amplifying an error voltage, which is the difference between the stepped-up or stepped-down voltage and the reference voltage, and outputting the amplified error voltage; a frequency oscillation circuit for generating a sine wave having a certain period; a differential circuit for differentiating the sine wave transmitted from the frequency oscillation circuit; a constant current circuit for outputting a constant current; and a compensation circuit for comparing a value generated by addition of an output value of the differential circuit and the constant current of the constant current circuit with the amplified error voltage outputted from the error amplification circuit, generating from the comparison a pulse wave having a certain period, and transmitting the pulse wave to the voltage step-up/step-down circuit unit.

Preferably, the value generated by addition of the out value of the differential circuit and the constant current of the constant current circuit is output in a sawtooth wave form.

It is understood that the term "vehicle" or "vehicular", or other similar term as used herein is inclusive of motor vehicles in general such as passenger automobiles including sports utility vehicles (SUV), buses, trucks, various commercial vehicles, watercraft including a variety of boats and ships, aircraft, and the like.

Other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1A:
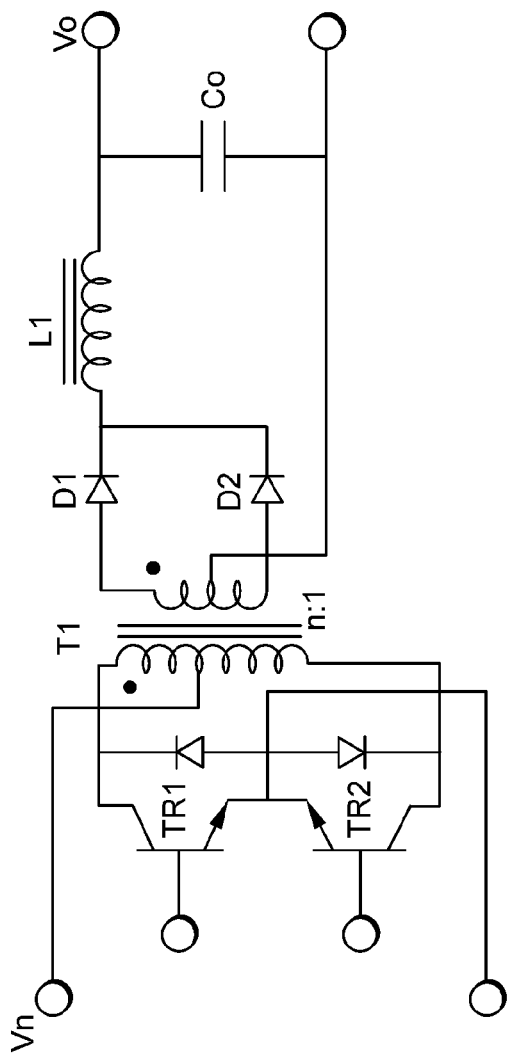
FIG. 1A is a circuit diagram showing a prior art push-pull converter.
Figure 1B:
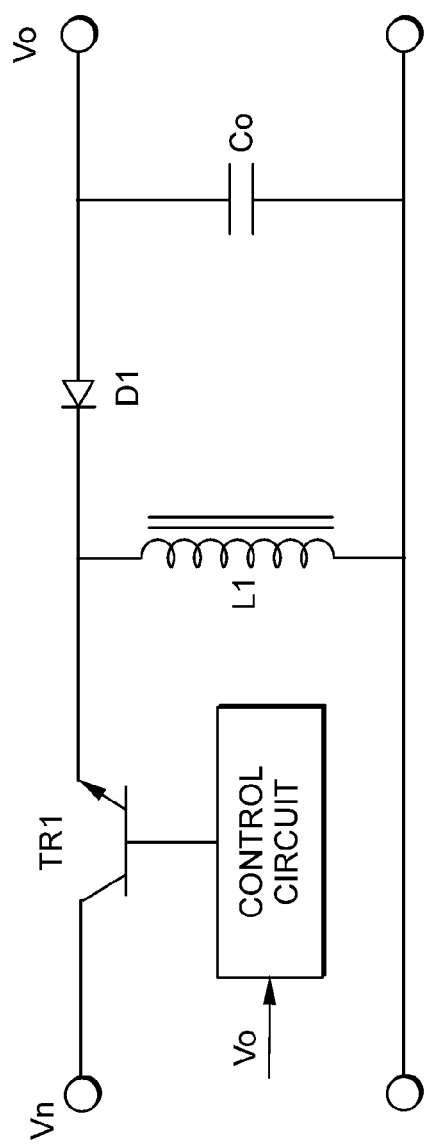
FIG. 1B is a circuit diagram showing a prior art buck-boost converter.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
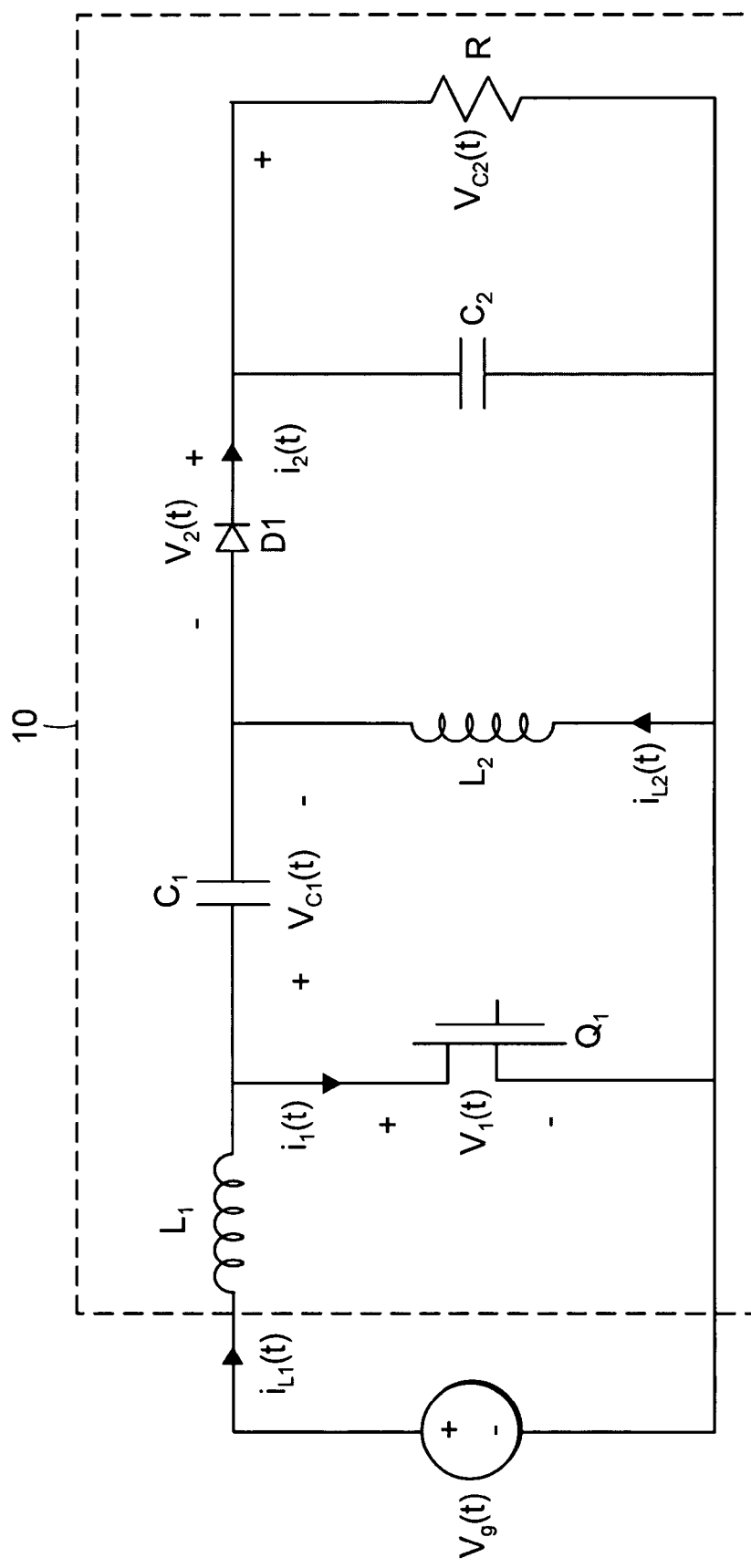
FIG. 2 is a circuit diagram showing a SEPIC according to a preferred embodiment of the present invention.

FIG. 2 is a circuit diagram showing a voltage step-up and step-down circuit unit according to a preferred embodiment of the present invention.

Referring to FIG. 2, a voltage step-up/step-down circuit unit 10 is a converter for outputting a constant output value, determined according to a switching period. The principle of the operation thereof is described below.

First, when a switch is turned on, energy is stored in a first inductor L1. When the switch is turned off, energy is stored both in a first capacitor C1 and in a second capacitor C2. Thereafter, when the switch is turned on again, energy is stored in the first inductor L1, and the energy stored in the first capacitor C1 is transferred to a second inductor L2. In this case, since power is not transferred, due to a rectifier diode D1, the energy stored in the second capacitor C2 is consumed by a load R. When the switch is turned off again, the energy stored in the first and second inductors L1 and L2 is exhausted.

Figure 3:
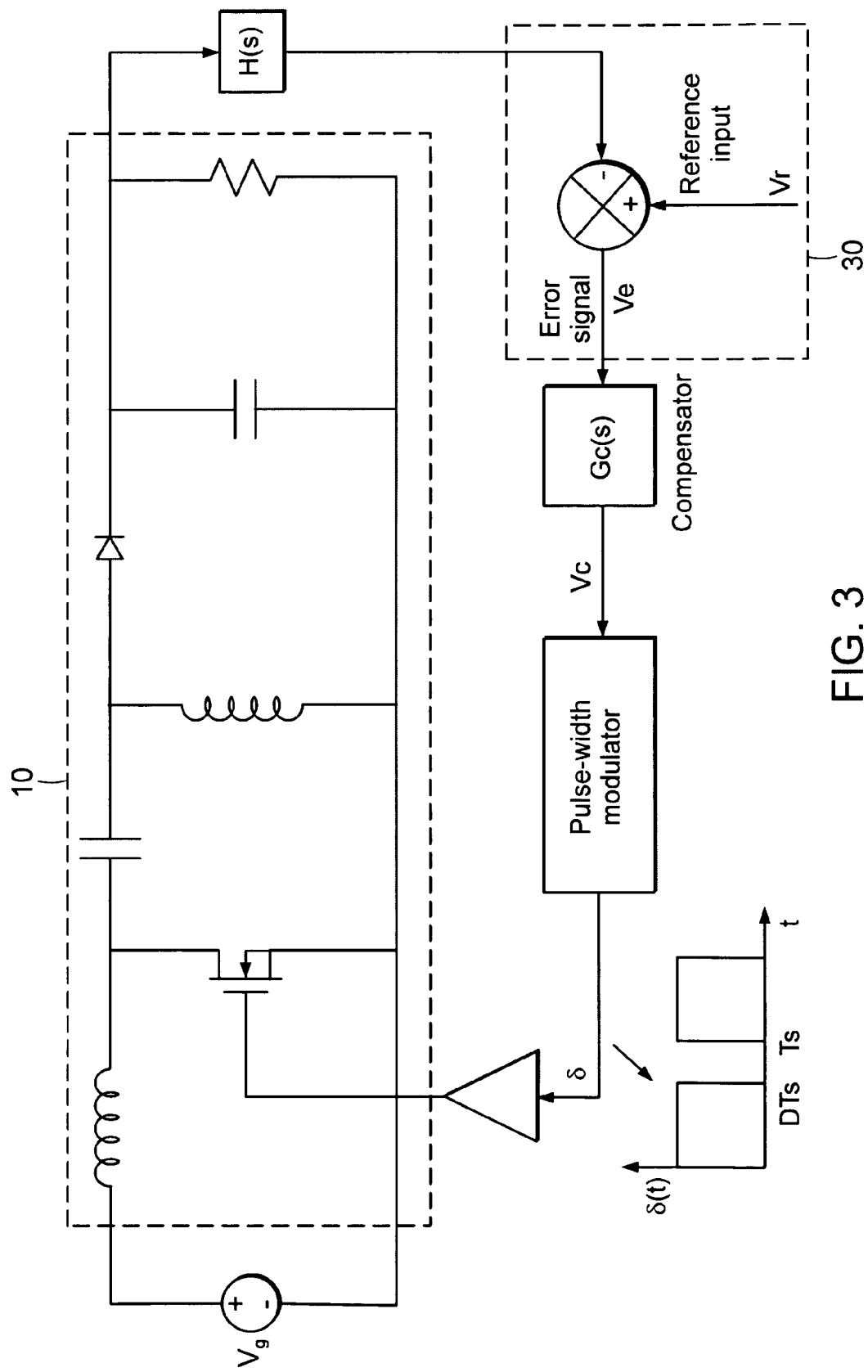
FIG. 3 is a conceptual diagram showing an illumination stabilization apparatus for a vehicle headlamp according to a preferred embodiment of the present invention.

FIG. 3 is a conceptual diagram showing an illumination stabilization apparatus for a vehicle headlamp according to an embodiment of the present invention.

Referring to FIG. 3, the illumination stabilization apparatus includes a voltage step-up/step-down circuit unit 10 and an error amplifier 30. The voltage step-up/step-down circuit unit 10 steps up or steps down an input voltage supplied from a power source according to a specific switching period of a switch.

The error amplifier 30 amplifies an error voltage, which is the difference between the stepped-up or stepped-down voltage by the voltage step-up/step-down circuit unit 10 and an externally applied reference voltage, and transmits the amplified error voltage to a compensator. A pulse having a certain period is generated according to the error voltage, which is amplified and transmitted by the error amplifier 30, and is transmitted as an operation signal for the switch.

Figure 4:
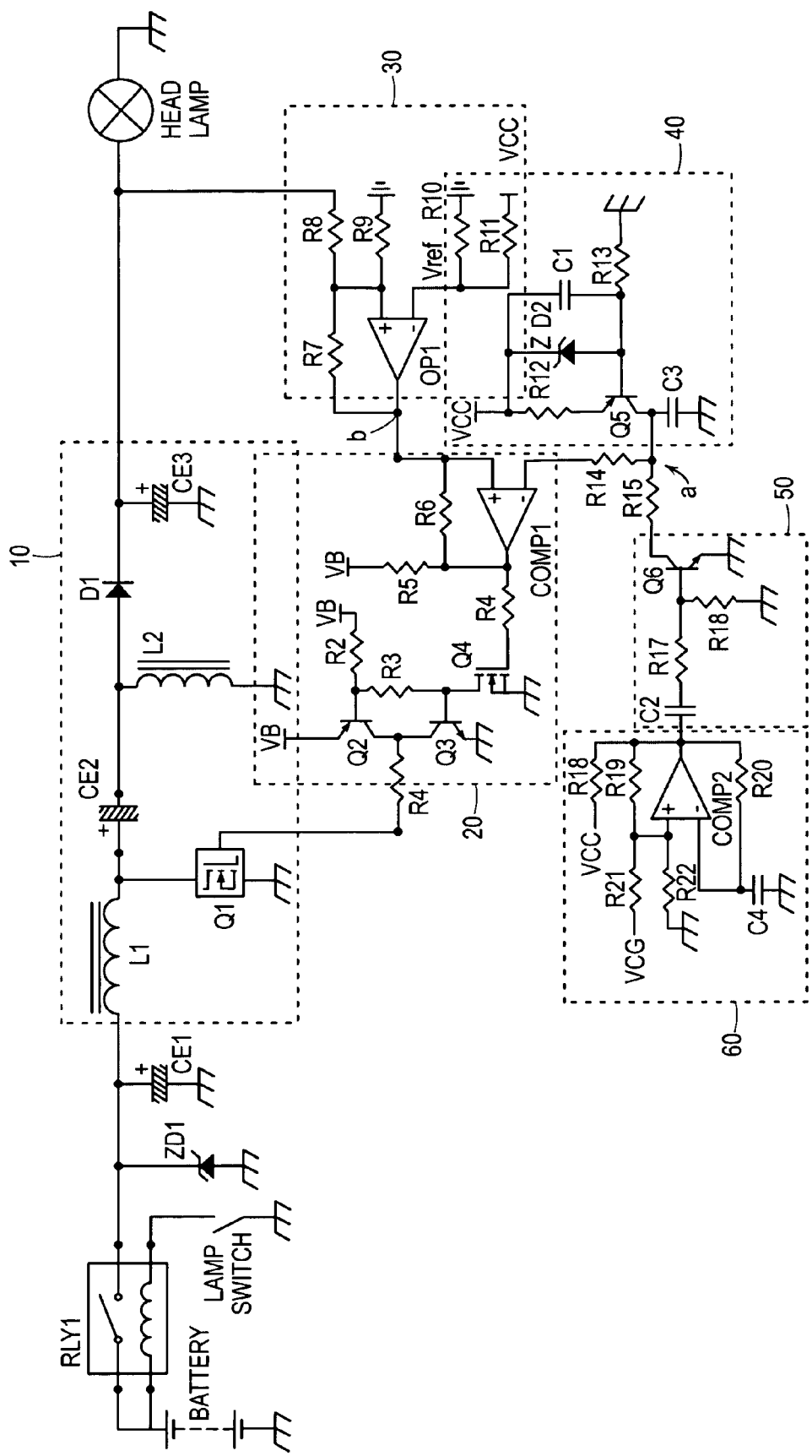
FIG. 4 is a detailed circuit diagram showing an illumination stabilization apparatus for a vehicle headlamp according to a preferred embodiment of the present invention.

FIG. 4 is a diagram showing an illumination stabilization apparatus for a vehicle headlamp according to a preferred embodiment of the present invention.

The illumination stabilization apparatus includes a voltage step-up/step-down circuit unit 10, a compensation circuit 20, an error amplification circuit 30, a constant current circuit 40, a differential circuit 50, and a frequency oscillation circuit 60.

The voltage step-up/step-down circuit unit 10, as described in FIG. 3, steps up or down an input voltage to a certain voltage according to a specific switching period of a switch, and outputs the stepped-up or stepped-down voltage.

The error amplification circuit 30 compares the voltage output from the voltage step-up/step-down circuit unit 10 with a reference voltage, and amplifies an error voltage, which is the difference between the voltage values, using an Operational Amplifier (OP-AMP).

The frequency oscillation circuit 60 generates a sine wave having a certain period. The differential circuit 50 differentiates the sine wave transmitted from the frequency oscillation circuit 60. The constant current circuit 40 outputs a constant current. The differentiated value of the sine wave from the differential circuit 50 and the constant current value are added, and thus a sawtooth wave having a certain period is output.

The compensation circuit 20 compares the sawtooth wave with the amplified error voltage from the error amplification circuit 30, outputs a pulse-width modulated wave resulting from the comparison, and inputs the pulse-width modulated wave to the voltage step-up/step-down circuit unit 10 as a signal required to operate the switch thereof, thus enabling the pulse-width modulated wave to function as the switch input signal of the voltage step-up/step-down circuit unit 10.

Accordingly, the illumination stabilization apparatus for a vehicle headlamp according to the present invention maintains a stable output voltage to a the vehicle headlamp, thereby enabling the vehicle headlamp to emit light having uniform illuminance, improving vehicle convenience, lengthening the lifespan of parts of the vehicle and reducing the cost of maintaining the vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An illumination stabilization apparatus for a vehicle headlamp, comprising:

a voltage step-up/step-down circuit unit for stepping up or down an input voltage to a voltage according to a switch signal, and outputting the stepped-up or stepped-down voltage;

an error amplification circuit for comparing the output voltage of the voltage step-up/step-down circuit unit with an external reference voltage, amplifying an error voltage, which is the difference between the stepped-up or stepped-down voltage and the reference voltage, and outputting the amplified error voltage;

a frequency oscillation circuit for generating a sine wave having a certain period;

a differential circuit for differentiating the sine wave transmitted from the frequency oscillation circuit;

a constant current circuit for outputting a constant current; and a compensation circuit for comparing a value generated by addition of an output value of the differential circuit and the constant current of the constant current circuit with the amplified error voltage outputted from the error amplification circuit, generating from the comparison a pulse wave having a certain period, and transmitting the pulse wave to the voltage step-up/step-down circuit unit.

2. The illumination stabilization apparatus according to claim 1, wherein the value generated by addition of the output value of the differential circuit and the constant current of the constant current circuit is output in a sawtooth wave form.

* * * * *